United States Patent
Krishnaswamy et al.

(10) Patent No.: US 8,955,054 B2
(45) Date of Patent: Feb. 10, 2015

(54) METHOD AND APPARATUS FOR PROVIDING SIMULTANEOUS SUPPORT FOR MULTIPLE MASTER KEYS AT AN ACCESS POINT IN A WIRELESS COMMUNICATION SYSTEM

(75) Inventors: Dilip Krishnaswamy, San Diego, CA (US); Patrik Lundqvist, San Diego, CA (US); Krishnan Rajamani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 476 days.

(21) Appl. No.: 12/984,664

(22) Filed: Jan. 5, 2011

(65) Prior Publication Data

US 2011/0167478 A1 Jul. 7, 2011

Related U.S. Application Data

(60) Provisional application No. 61/292,661, filed on Jan. 6, 2010.

(51) Int. Cl.
*H04L 29/06* (2006.01)
*H04W 12/04* (2009.01)
*H04L 12/801* (2013.01)
(Continued)

(52) U.S. Cl.
CPC ............... *H04W 12/04* (2013.01); *H04L 47/10* (2013.01); *H04L 47/805* (2013.01); *H04L 47/824* (2013.01); *H04L 63/102* (2013.01); *H04W 12/08* (2013.01); *H04W 72/04* (2013.01); *H04W 76/02* (2013.01); *H04W 84/12* (2013.01); *H04W 88/08* (2013.01); *H04W 88/16* (2013.01); *H04W 92/02* (2013.01)

USPC ................................. 726/4; 726/12; 380/270

(58) Field of Classification Search
CPC ...... H04L 47/10; H04W 12/04; H04W 12/08; H04W 92/02; H04W 72/04; H04W 76/02; H04W 88/10; H04W 88/16
USPC ......................................... 726/4, 12; 380/270
See application file for complete search history.

(56) References Cited

U.S. PATENT DOCUMENTS 8,400,530 B2 * 3/2013 Ikeda et al. ............... 348/231.99
2002/0159589 A1 * 10/2002 She et al. ........................ 380/37

(Continued)

FOREIGN PATENT DOCUMENTS

KR 20070008512 A 1/2007
WO WO2006129287 A1 12/2006

OTHER PUBLICATIONS

International Search Report and Written Opinion—PCT/US2011/020325—ISA/EPO—Jul. 20, 2011.

(Continued)

*Primary Examiner* — Justin T Darrow
(74) *Attorney, Agent, or Firm* — Jeffrey Jacobs (57) ABSTRACT

The described apparatus and methods include a wireless local area network (WLAN) access point having a wireless wide area network (WWAN) backhaul connection to provide a gateway between a LAN and a WAN. In one example, the access point may be a cellular telephone. Here, a processor in the access point is configured to generate a plurality of master keys, such that a plurality of access terminals may each utilize a respective one of the master keys to access the LAN. Further, the processor is configured to enable control of an allocation of resources to at least one of the access terminals.

50 Claims, 4 Drawing Sheets

(51) Int. Cl.
  *H04L 12/927* (2013.01)
  *H04L 12/911* (2013.01)
  *H04W 12/08* (2009.01)
  *H04W 72/04* (2009.01)
  *H04W 76/02* (2009.01)
  *H04W 84/12* (2009.01)
  *H04W 88/08* (2009.01)
  *H04W 88/16* (2009.01)
  *H04W 92/02* (2009.01)

(56) References Cited

U.S. PATENT DOCUMENTS

| | | | |
|---|---|---|---|
| 2003/0110131 A1* | 6/2003 | Alain et al. | 705/51 |
| 2004/0032168 A1* | 2/2004 | Allison et al. | 307/64 |
| 2004/0078598 A1 | 4/2004 | Barber et al. | |
| 2006/0002353 A1 | 1/2006 | Doi | |
| 2006/0153122 A1 | 7/2006 | Hinman et al. | |
| 2006/0179326 A1* | 8/2006 | Leung | 713/193 |
| 2006/0251256 A1 | 11/2006 | Asokan et al. | |
| 2007/0150720 A1 | 6/2007 | Oh et al. | |
| 2007/0160017 A1 | 7/2007 | Meier et al. | |
| 2007/0268915 A1* | 11/2007 | Zelig et al. | 370/401 |
| 2007/0280481 A1 | 12/2007 | Eastlake et al. | |
| 2008/0016556 A1 | 1/2008 | Selignan | |
| 2009/0180430 A1 | 7/2009 | Fadell | |
| 2009/0232311 A1 | 9/2009 | Meier et al. | |

OTHER PUBLICATIONS

Taiwan Search Report—TW100100539—TIPO—Jul. 19, 2013.
"We iPhone 3GS," Mac People, Japan, ASCII Media Works Inc., Sep. 1, 2009, vol. 15, No. 9, pp. 18-21.
Bokichi., "iPhone OS 3.0" & "iPhone 3GS," I/O, Japan, Kohgakusha Co., Ltd., Aug. 1, 2009, vol. 34, No. 8, pp. 16-17.
Gene., "Basics of Network Construction", Mainichi Communications Inc., Nobuyuki Nakagawa, Nov. 24, 2009, First edition, pp. 130-132.

* cited by examiner

METHOD AND APPARATUS FOR PROVIDING SIMULTANEOUS SUPPORT FOR MULTIPLE MASTER KEYS AT AN ACCESS POINT IN A WIRELESS COMMUNICATION SYSTEM

CROSS-REFERENCE TO RELATED APPLICATION(S)

This application claims the benefit of U.S. Provisional Patent Application No. 61/292,661, entitled "Method and Apparatus for Providing Simultaneous Support for Multiple Master Keys at an Access Point in a Wireless Communication System," filed on Jan. 6, 2010, which is expressly incorporated by reference herein in its entirety.

BACKGROUND

1. Field

The present disclosure relates generally to wireless communication systems. More specifically, the present disclosure relates to a method and apparatus for providing simultaneous support for multiple master keys at an access point in a wireless communication system.

2. Introduction

Recently, there has been a shift towards wireless technologies resulting in a surge of wireless products. Wireless versions exist for nearly all products. An area of wireless technology that has seen significant growth over the past decade is wireless networking, and more specifically Wireless Local Area Networks (WLAN). WLANs are becoming more prevalent, and are available nearly everywhere. Cities are deploying city-wide wireless networks, wireless connectivity is available in businesses, homes, libraries, airports, and even coffee shops. The benefits of wireless networks are undeniable. They are extremely convenient, providing increased mobility and efficiency. Furthermore, wireless networks are easy to expand, and easy to deploy. However, despite all the benefits of wireless networks, issues of security exist with WLANs.

The IEEE 802.11 protocol is a governing standard for WLANs. As wireless networking technology has developed, the IEEE 802.11 standard has undergone multiple amendments. Each amendment is aimed to address specific shortcomings of wireless networks. See, for example, IEEE 802.11-2007 IEEE Standard for Information technology-Telecommunications and information exchange between systems-Local and metropolitan area networks-Specific requirements—Part 11: Wireless LAN Medium Access Control (MAC) and Physical Layer (PHY) Specifications. These amendments are designated by a letter following "802.11," and have introduced various improvements on the original 802.11 standard. The 802.11b and 802.11g standards are two modulation amendments that are widely used for implementing home wireless networks. The 802.11i standard is an amendment to the 802.11 standard implementing various security mechanisms for wireless networks. In accordance with the 802.11i standard, the WiFi Protected Access 2 (WPA2) protocol supplemented the wired equivalent privacy (WEP) and WiFi Protected Access (WPA) protocols. WPA is a software/firmware improvement over Wired Equivalent Privacy (WEP). WPA and WPA2 may use a master key, such as a pre-shared Shared Key (PSK), to establish a secure link using an 8 to 63 character pass-phrase. The PSK may also be entered as a 64 character hexadecimal string.

In general, WLAN enables wireless devices within the coverage area of the access point to communicate with one another and, through an associated infrastructure, with other devices that are coupled to another network. For example, an 802.11-based access point may provide connectivity to enable a wireless terminal (e.g., an access terminal) to communicate via an access point with another network (e.g., a wide area network (WAN) such as the Internet), or peripherals on the WLAN, such as a printer, scanner, storage device, etc.

The access point is typically configured to have only one master key that provides access to the WLAN. This master key does not discriminate amongst the users that use it to access the WLAN through the access point, and allows unfettered access to the WLAN for any user that uses the master key. In other words, typical access points cannot provide different access privileges to different users when each user uses the single master key.

Accordingly, there exists a need in the art for a method and apparatus for providing simultaneous support for multiple master keys at an access point in a wireless communication system, such as WLAN.

SUMMARY

A WLAN access point may include a wireless wide area network (WWAN) backhaul connection to provide a gateway between a local area network (LAN) and a WAN. In one example, the access point may be a cellular telephone. Here, a processor in the access point is configured to generate a plurality of master keys, such that a plurality of access terminals may each utilize a respective one of the master keys to access the LAN. Further, the processor is configured to enable control of an allocation of resources to at least one of the access terminals.

In one aspect, the disclosure provides a wireless local area network access point including a wireless wide area network transceiver for establishing a backhaul connection to a WAN, a wireless local area network transceiver for establishing a LAN, and a processor configured to generate a plurality of master keys to provide a gateway to the WAN for a plurality of access terminals each utilizing a respective one of the master keys to access the LAN. Here, the processor may be further configured to enable control of an allocation of resources to at least one of the access terminals.

Another aspect of the disclosure provides a method of wireless communication, including establishing a backhaul connection from an access point to a WWAN, establishing a WLAN from the access point utilizing a WLAN transceiver, generating a plurality of master keys in the access point to provide a gateway to the WWAN for a plurality of access terminals each utilizing a respective one of the master keys to access the WLAN, and controlling an allocation of resources to at least one of the access terminals.

Yet another aspect of the disclosure provides an apparatus for wireless communication, including means for establishing a backhaul connection from an access point to a wireless wide area network, means for establishing a WLAN from the access point utilizing a wireless local area network transceiver, means for generating a plurality of master keys in the access point to provide a gateway to the WWAN for a plurality of access terminals each utilizing a respective one of the master keys to access the WLAN, and means for controlling an allocation of resources to at least one of the access terminals.

Still another aspect of the disclosure provides a computer program product, including a computer-readable medium having code for establishing a backhaul connection from an access point to a WWAN, code for establishing a WLAN from the access point utilizing a wireless local area network transceiver, code for generating a plurality of master keys in the access point to provide a gateway to the WWAN for a plurality of access terminals each utilizing a respective one of the master keys to access the WLAN, and code for controlling an allocation of resources to at least one of the access terminals.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system," "apparatus" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, mobile telephone, remote station, remote terminal, access terminal, access point, user terminal, communication device, user agent, user device, or user equipment (UE). A wireless terminal, which may also be referred to as an access terminal, access point, a remote access terminal, a wireless communication apparatus, or an apparatus, may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as a Node B, evolved Node B (eNB), or some other terminology. An access server may be utilized for communicating with wireless terminal(s) via an integrated wireless transceiver or a peripheral wireless transceiver and for providing access to the Internet or other networks.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as a Wireless Local Area Network (WLAN) utilizing the IEEE 802.11 protocol and any other similar wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
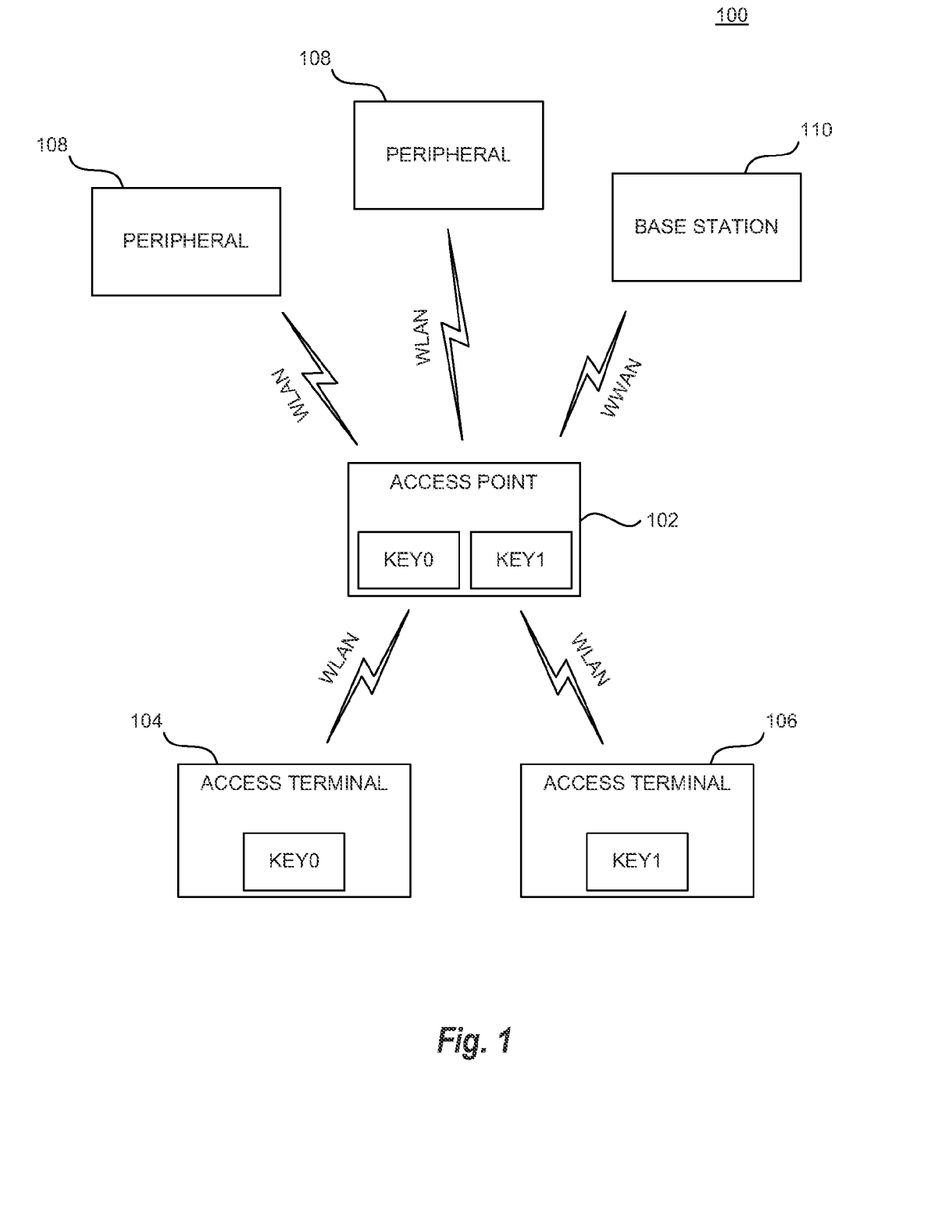
FIG. 1 illustrates aspects of a wireless communication system capable of providing support for multiple master keys at an access point.

FIG. 1 is a block diagram illustrating one example of a wireless communication system 100. System 100 may include an access point 102, an access terminal 104, an access terminal 106, peripherals 108, and a base station 110. According to some implementations, the access point 102 may be a wireless hotspot, such as a mobile phone, cellular phone, laptop computer, personal digital assistant device, backhaul, and/or any other device with at least a WWAN backhaul to provide access to a network, and WLAN communication capabilities. That is, the access point 102 may utilize a wireless air interface such as a cellular protocol to communicate with a base station 110 to establish connection to a network such as the Internet. Additionally, according to some implementations the access point 102 may be a WLAN router with a wired backhaul interface to a network, such as an Ethernet connection, utilizing a cable modem or a DSL connection. It should be noted that the access point 102 may be used for public as well as private purposes, such as for providing access to clients at an office, or at home. The access terminals 104 and 106 may be wireless devices, such as a mobile phone, cellular phone, laptop computer, personal digital assistant device, and/or any other device with at least WLAN communication capabilities for communicating with the access point 102. Furthermore, the peripherals 108 may be any electronic device, such as a printer, scanner, data storage device, etc. It should be noted that, although the connection shown between the peripherals 108 and the access point 102 is wireless, it may be either wireless or wired. Further, although FIG. 1 shows only one access point 102, two access terminals 104 and 106, two peripherals 108, and one base station 106, the communication system 100 may include any number of access points, access terminals, peripherals, and base stations.

Figure 2:
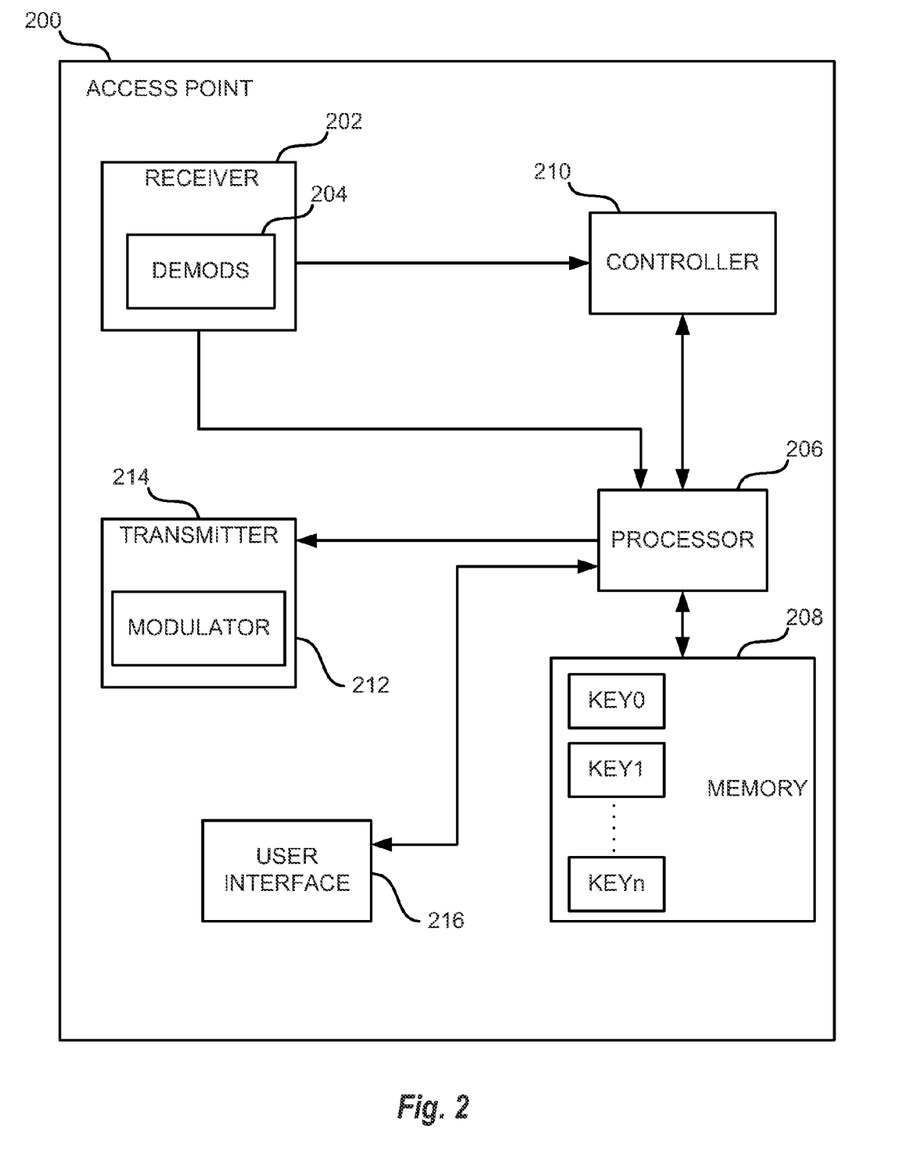
FIG. 2 illustrates an example of an access point that is capable of providing support for multiple master keys in a wireless communications system.

FIG. 2 is a block diagram illustrating a detail view of an access point 200. The access point 200 may correspond to the access point 102 shown in FIG. 1. As shown in FIG. 2, the access point 200 may include one or more receivers 202 for receiving signals from, for instance, one or more receive antennas (not shown), performing typical actions on (e.g., filtering, amplifying, downconverting, etc.) the received signals, and digitizing the conditioned signals to obtain samples. The one or more receivers 202 may be configured to communicate within various networks, such as a WWAN, WLAN, and/or a WPAN. A WWAN transceiver may be any transceiver compliant with regional, national, and/or global communication standards (e.g., cdma2000, 3GPP UMTS, 3GPP Long Term Evolution (LTE), WiMAX, etc.), and may be configured to transmit and receive signals over distances spanning regional, national, and/or global areas, such as to and from base station 110 (see FIG. 1). A WLAN transceiver may be any transceiver compliant with any standard that facilitates medium range communication (e.g., 802.11g, 802.11n, etc.), and may be configured to transmit and receive signals over intermediate distances, such as to and from devices within an office building, such as peripherals 108 and access terminals 104 and 106 (see FIG. 1). A PAN transceiver may be any transceiver compliant with any standard that facilitates short-range, low-power communication (e.g., UWB, Bluetooth, ZigBee, etc.), and may be configured to transmit and receive signals over short distances, such as to and from devices located in close proximity to one another.

The receiver 202 may be a single receiver, as illustrated, or may include multiple receivers for supporting multiple communication protocols. The one or more receivers 202 may also include one or more demodulators 204 for demodulating received symbols from each signal and providing them to a processor 206. The processor 206 can be a processor dedicated to analyzing information received by the receiver 202 and/or generating information for transmission by a transmitter 214, a processor that controls one or more components of the access terminal 200, and/or a processor that both analyzes information received by the receiver 202, generates information for transmission by the transmitter 214, and controls one or more components of the access terminal 200.

The access point 200 may additionally include memory 208 that is operatively coupled to the processor 206 and that can store data such as data to be transmitted, received data, information related to available channels, data associated with analyzed signal and/or interference strength, master keys KEY0-KEYn, information related to an assigned channel, power, rate, or the like, and any other suitable information for estimating a channel and communicating via the channel. Memory 208 can additionally store protocols and/or algorithms associated with estimating and/or utilizing a channel (e.g., performance based, capacity based, etc.).

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to comprise, without being limited to, these and any other suitable types of memory.

The receiver 202 can further be operatively coupled to a controller 210 for generating a plurality of master keys for use by a plurality of access terminals within one frequency spectrum. The instructions for generating the plurality of master keys may be stored in the memory 208. The controller 210 may further control the storage of the master keys in the memory 208, and direct communications with access terminals, peripherals, base stations, and devices on other networks, by interfacing with transmitter 214 via the processor 206, as discussed with reference to FIG. 1. The transmitter 214 may be configured to communicate within various networks, such as WAN, LAN, and PAN. The transmitter 214 may be a single transmitter, as shown, or include multiple transmitters for each separate communication protocol.

Furthermore, the transmitter 214 and the receiver 202, although shown as separate components, may be integrated into a single component, such as a transceiver. The transceiver may retain all of the functions of the receiver 202 and transmitter 214, and as such, may be configured to transmit and receive signals within various networks, such as the WAN, LAN, and PAN. The transceiver may also be either a single integrated transceiver capable of multi-protocol communication, or include multiple separate transceivers for each respective communication protocol. For example, the transceiver may include high power transceivers (e.g., WAN and LAN transceivers) and a low power transceiver (e.g., PAN transceiver).

The access point 200 may still further include a modulator 212 that modulates and transmits signals via the transmitter 214 to, for instance, an access terminal, a base station, a peripheral, etc. Although depicted as being separate from the processor 206, it is to be appreciated that the controller 210, demodulators 204, and/or modulator 212 can be part of the processor 206 or multiple processors (not shown). Furthermore, the functions of the controller 210 may be integrated in an application layer, a driver, a data stack, an HTTP stack, at the operating system (OS) level, in an internet browser application, or in an application specific integrated circuit (ASIC).

The access point 200 may still further include a user interface 216 for enabling a user to provide input to the processor 206 and/or the controller 210, and for enabling the access point 200 to provide information to the user.

Referring again to FIG. 1, in an aspect of the present disclosure, the access point 102 may be configured to provide simultaneous support for a plurality of master keys, e.g., KEY0 and KEY1. In one example, a master key may be a Pre-Shared Key (PSK) that enables the encryption and decryption of data transmitted between the access point 102 and access terminals 104 and 106.

The access point 102 may generate a plurality of master keys for use by a plurality of access terminals, e.g., utilizing a wireless communication access channel. In one example, the access point 102 may generate a first master key KEY0 that would allow open access to the peripherals 108 and to the backhaul network (e.g., the Internet) via the base station 110. In addition to the first master key KEY0, the access point 102 may generate a second master key KEY1 that would, for example, allow limited access only to the backhaul network via the base station 110. That is, the access point 102 may provide a plurality of separate, secure networks, e.g., one for known users or personal peripherals, and another for ad-hoc users. Further, having two different master keys may allow a user of the access point 102 to modify access privileges associated with the second master key KEY1, while leaving access privileges associated with the first master key KEY0 unchanged. This may facilitate modification of access privileges for different groups of access terminals.

In an aspect of the disclosure, the access point 102 may utilize one or more service set identifiers (SSID). The SSID may be broadcast such that it is visible to access terminals within range, or may not be broadcast, such that an access terminal within range would need to have prior knowledge of the SSID to enable communication with the access point 102. In some aspects, a single SSID utilized by the access point 102 may enable access to the backhaul network when an access terminal provides any one of a plurality of predetermined master keys for accessing the network. That is, a network corresponding to a single SSID may be accessed by providing any one of a plurality of acceptable master keys. Here, the plurality of master keys may be stored as a list in a memory in the access point 102, and an access key provided by an access terminal attempting to access the access point 102 would be compared to the master keys in the memory, e.g., in a logical "OR" fashion, such that if the access key provided by the access terminal would be accepted if it matched any one of the entries in the list of master keys. In some aspects, multiple SSIDs may be used to access the backhaul network for the access point 102, with a different master key corresponding to each of the plurality of SSIDs. In other aspects, essentially any number of SSIDs may correspond to essentially any number of master keys for accessing the backhaul network.

In a further aspect of the disclosure, a user of the access point 102 may utilize the UI 216 (see FIG. 2) to modify access privileges associated with one or more of the master keys, e.g., KEY0 and KEY1, as well as to generate additional master keys (e.g., up to KEYn) with other different access privileges. In a still further aspect of the disclosure, the UI 216 may enable a user to adjust a priority of a data flow or a quality of service QoS associated with each of the respective master keys. For example, the user may configure the access point 200 to limit the bandwidth used by all access terminals using the second master key KEY1. Furthermore, the user may modify the access point 200 to grant a flow associated the access terminals utilizing a particular key, e.g., KEY0, with priority over the access terminals associated with at least one of the other keys, e.g., KEY1. In a further example, a flow associated with any particular one of the master keys may be de-prioritized as needed, such as when another one of the flows is determined to be carrying high priority information. For example, if an owner of the access point is selling access to ad-hoc users, the owner of the access point may wish to grant higher priority to flows associated with the users utilizing ad-hoc network master keys. In another example, an owner of the access point may wish to share access to the backhaul network, but when executing particularly important functions such as a high priority voice or video conference call, may de-prioritize the flows associated with the ad-hoc users such that the flow associated with the primary user can continue unimpeded.

In an aspect of the disclosure, the access privileges for each of the access terminals may include an automated allocation of resources to each of the access terminals in correspondence to one or more factors. That is, a processor or controller in the access point 102 may make a determination of priority or a quality of service corresponding to a particular access terminal, or to a particular client group utilizing a particular subnet, in correspondence with certain factors. Some of the factors that may be considered in the making of the determination of the allocation of resources may include an amount of resources or bandwidth on the backhaul network and a demand for a certain amount of bandwidth or a quality of service from a particular access terminal; the energy available at the access point 102 and the demands or requests for energy from a particular access terminal or client group; the processing headroom available in the access point 102 and the demands or requests for processing power from a particular access terminal or client group; or revenue generated by granting access to the backhaul network to a particular access terminal or client group. For example, assume that one access terminal is running a video application such as a video conference. Here, the uploading of the video content may be an energy-intensive application, which would require a significant portion of the available energy available at the access point. Further, the video may require processing power for encoding or compression, utilizing a substantial amount of the processing power available at the access point. These and other factors may be considered in a determination, for example, to grant additional resources to that particular access point, while restricting those resources from other access terminals. However, if another one of the access terminals is a paying user, the access point may alter its decision based on this factor, to provide better service to the paying user while possibly slowing or preventing the video session from the first access terminal.

With a conventional access point, if an access terminal is granted access to a backhaul network, then the granted user may be capable of accessing any other users utilizing the access point for access to the backhaul network. This may be undesired when an ad-hoc user is not a trusted user. Thus, in a further aspect of the disclosure, the access point 102 may also be configured to provide a firewall between groups of one or more access terminals utilizing the access point 102 to access the backhaul network. As such, the access point 102 may be configured to simultaneously support multiple client groups, each made up of one or more access terminals. The client groups may be considered separate networks or subnets of a single network. In one example, the access point 102 may configure the first master key KEY0 to provide access to a first wireless client network group. Here, all clients that utilize the first master key KEY0 may be able to access the first wireless client network group using the first master key KEY0 as the pairwise master key (PMK) for session establishment. The access point 102 may also configure the second master key KEY1 to provide access to a second wireless client network group. All clients that have the second master key KEY1 may be able to access the second wireless client group using the second master key KEY1 as the PMK for session establishment. The access point 102 may be modified to allow access to the backhaul network using either the first master key KEY0 or the second master key KEY1. The access point 102 may be modified to allow access to the backhaul network using additional master keys, e.g., up to KEYn. Additionally, the access point 102 may allow other clients without any of the master keys to request connectivity to the access point 102 by alternative access-enabling mechanisms. Such an access-enabling mechanism may include, for example, a message suggesting a symmetric session key from the client to the access point 102 where the message is encrypted with a public key associated with the access point 102. The access point 102 may thus enable multiple groups of clients, where each group may connect to the access point 102 using different access-enabling mechanisms.

Of course, some of the client groups may include devices such as printers that the owner of the access point 102 may wish to enable access terminals, even those of untrusted ad-hoc users, to be able to access. Thus, the firewalling between client groups may be enabled to be managed by the access point 102 to enable ad-hoc users who use a publicly available master key to access one or more client devices utilizing the WLAN made available by the access point 102.

Figure 3:
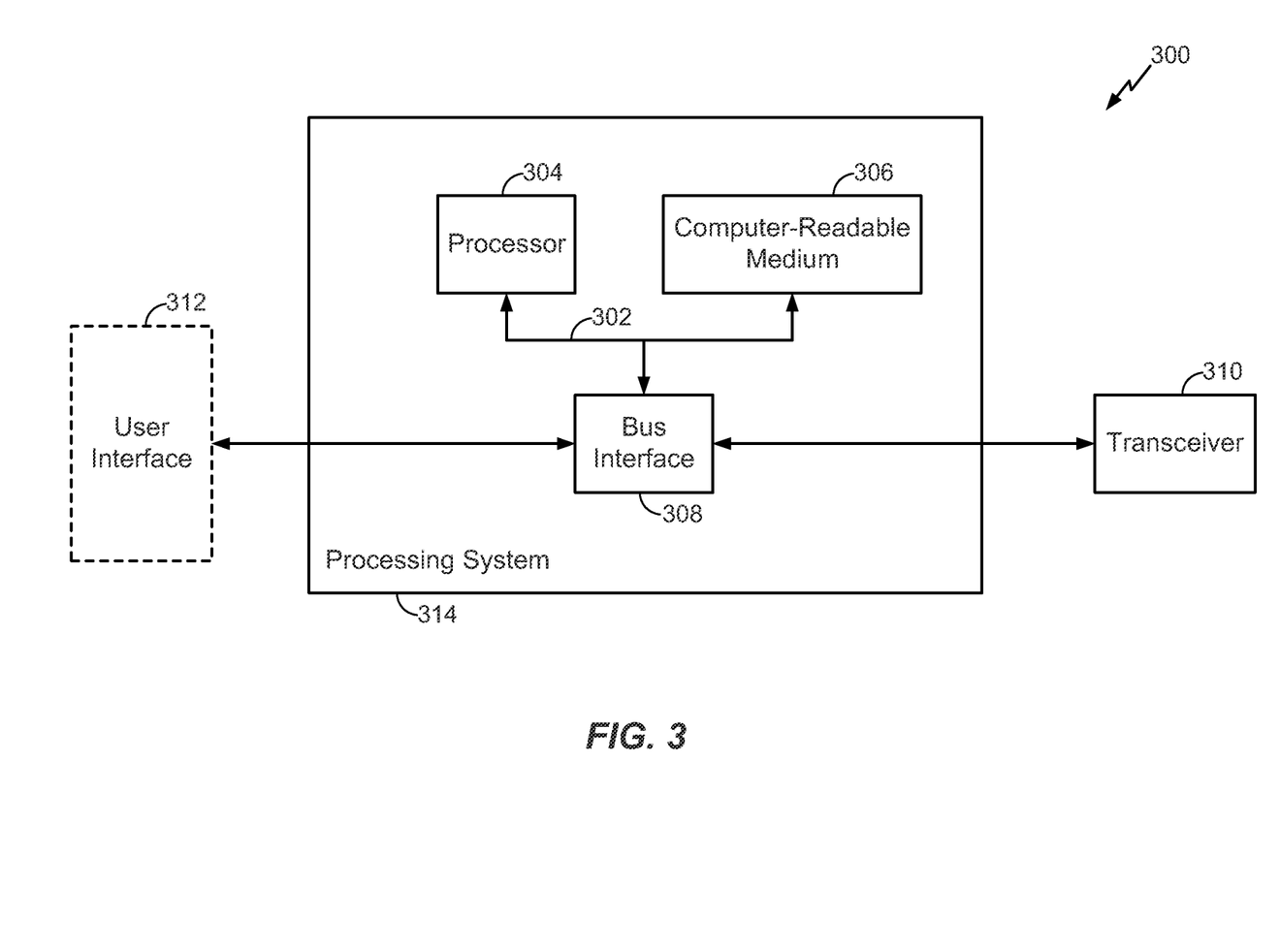
FIG. 3 is a block diagram illustrating an example of a hardware implementation for an apparatus employing a processing system.

FIG. 3 is a block diagram illustrating an example of a hardware implementation for an apparatus 300 employing a processing system 314. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

In one configuration, the apparatus 200 (referring again to FIG. 2) for wireless communication may include means for establishing a backhaul connection from an access point to a wireless wide area network; means for establishing a wireless local area network from the access point utilizing a wireless local area network transceiver; means for generating a plurality of master keys in the access point to provide a gateway to the wireless wide area network for a plurality of access terminals each utilizing a respective one of the master keys to access the wireless local area network; and means for controlling an allocation of resources to at least one of the access terminals. In one aspect, the aforementioned means may be the processor(s) 206, the controller 210, the transmitter 214, the receiver 202, the user interface 216, and/or the memory 208, configured to perform the functions recited by the aforementioned means. In another aspect, the aforementioned means may be a module or any apparatus configured to perform the functions recited by the aforementioned means.

Figure 4:
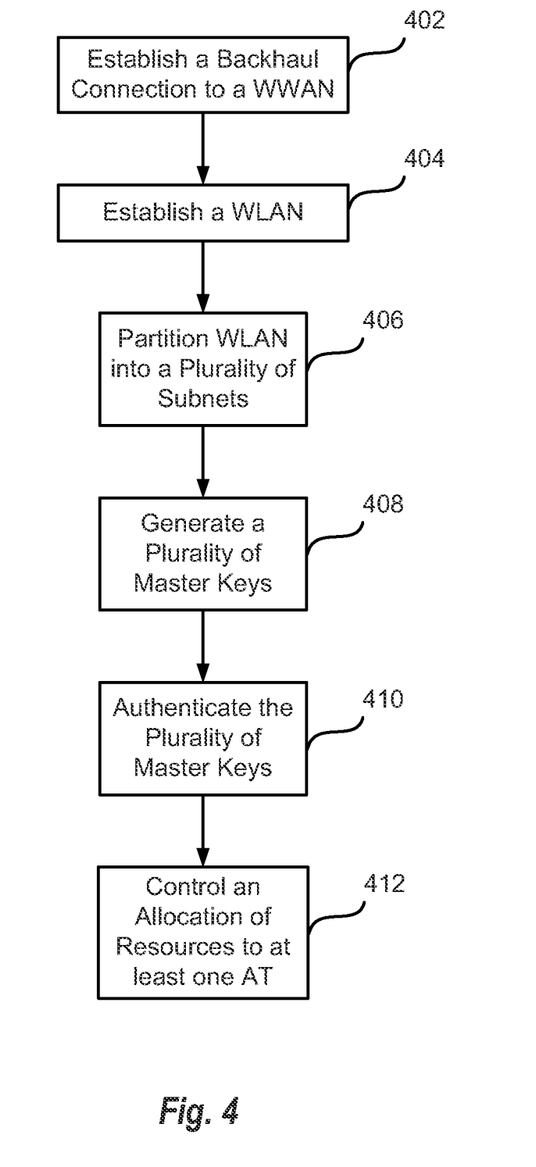
FIG. 4 is a flow chart illustrating an exemplary process for utilizing multiple master keys at an access point in accordance with an aspect of the disclosure.

FIG. 4 is a flow chart illustrating an exemplary process of utilizing a plurality of master keys at an access point in accordance with an aspect of the disclosure. In various representative aspects, the process may be performed by the Access Point 102 illustrated in FIG. 1, or the Access Point 200 illustrated in FIG. 2. In some aspects, the process may be performed by the processing system 314 illustrated in FIG. 3.

In step 402, the access point may establish a backhaul connection to a WWAN. For example, the access point may utilize any suitable cellular radio air interface technology to establish a connection and utilize resources to a corresponding wireless network. In block 404, the access point may establish a WLAN. For example, the access point may set up resources to provide a local area network utilizing an 802.11 standard air interface. In block 406, the process may partition the WLAN into a plurality of subnets. Here, each of the subnets may be firewalled from each other one of the subnets.

In block 408, the access point may generate a plurality of master keys, such as to provide a gateway to the wireless wide area network for a plurality of access terminals, each of the access terminals utilizing a respective one of the master keys to access the wireless local area network.

In block 410, the access point may authenticate the plurality of master keys. For example, if an access terminal sends one of the master keys to the access point, the access point may compare the master key received with a table of master keys authorized to access the backhaul network. Upon authentication, the access point may enable the access terminal to utilize the gateway through the access point to access the backhaul network by way of the wireless local area network.

In block 412, the access point may control an allocation of resources to at least one of the access terminals, for example, by increasing or decreasing a priority of a flow corresponding to the access terminal in accordance with one or more factors. Here, the factors may include a quality of service or bandwidth demand for a particular access terminal, an amount of energy available at the access point and a demand or request for energy from a particular access terminal, a processing headroom available in the access point and a demand or request for processing power from a particular access terminal, and/or revenue generated by granting access to the WWAN to a particular access terminal.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Further, several aspects of a telecommunications system have been presented in the present disclosure to enable a backhaul connection to a WWAN. As those skilled in the art will readily appreciate, various aspects described throughout this disclosure may be extended to any one of various telecommunication systems, network architectures and communication standards. By way of example, various aspects may be utilize UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also utilize systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless local area network access point comprising:
a wireless wide area network transceiver for establishing a backhaul connection to a wide area network;
a wireless local area network transceiver for establishing a local area network; and
a processor configured to generate a plurality of master keys to provide a gateway to the wide area network for a plurality of access terminals each utilizing a respective one of the master keys to access the local area network, at least two of the plurality of master keys being associated with different network groups from each other,
wherein each of the different network groups includes a different set of one or more of the access terminals, and
wherein the processor is further configured to enable control of an allocation of resources to at least one of the access terminals.

2. The wireless local area network access point of claim 1, wherein the control of the allocation of resources comprises increasing or decreasing a priority of a flow corresponding to the at least one of the access terminals in accordance with one or more factors.

3. The wireless local area network access point of claim 2, wherein the factors comprise a quality of service or bandwidth demand for a particular access terminal.

4. The wireless local area network access point of claim 2, wherein the factors comprise an amount of energy available at the access point and a demand or request for energy from a particular access terminal.

5. The wireless local area network access point of claim 2, wherein the factors comprise a processing headroom available in the access point, and a demand or request for processing power from a particular access terminal.

6. The wireless local area network access point of claim 2, wherein the factors comprise revenue generated by granting access to the wide area network to a particular access terminal.

7. The wireless local area network access point of claim 1, wherein each of the master keys corresponds to a single service set identifier for accessing the wide area network.

8. The wireless local area network access point of claim 1, wherein each of the master keys corresponds to one of a plurality of service set identifiers for accessing the wide area network.

9. The wireless local area network access point of claim 1, further comprising a user interface communicatively coupled to the processor.

10. The wireless local area network access point of claim 9, wherein the user interface is configured to enable control of access privileges to each of the access terminals.

11. The wireless local area network access point of claim 1, wherein the processor is further configured to authenticate at least one of the plurality of master keys.

12. The wireless local area network access point of claim 1, wherein the local area network is partitioned into a plurality of subnets, such that each of the subnets is firewalled from each other one of the subnets.

13. The wireless local area network access point of claim 12, wherein each of the master keys corresponds to one of the subnets.

14. The wireless local area network access point of claim 1, wherein the access point is a cellular telephone.

15. A method of wireless communication, comprising:
establishing a backhaul connection from an access point to a wireless wide area network;

establishing a wireless local area network from the access point utilizing a wireless local area network transceiver;

generating a plurality of master keys in the access point to provide a gateway to the wireless wide area network for a plurality of access terminals each utilizing a respective one of the master keys to access the wireless local area network, at least two of the plurality of master keys being associated with different network groups from each other, wherein each of the different network groups includes a different set of one or more of the access terminals; and controlling an allocation of resources to at least one of the access terminals.

16. The method of claim 15, wherein the controlling of the allocation of resources comprises increasing or decreasing a priority of a flow corresponding to the at least one of the access terminals in accordance with one or more factors.

17. The method of claim 16, wherein the factors comprise a quality of service or bandwidth demand for a particular access terminal.

18. The method of claim 16, wherein the factors comprise a processing headroom available in the access point, and a demand or request for processing power from a particular access terminal.

19. The method of claim 16, wherein the factors comprise revenue generated by granting access to the wireless wide area network to a particular access terminal.

20. The method of claim 15, wherein each of the master keys corresponds to a single service set identifier for accessing the wireless wide area network.

21. The method of claim 15, wherein each of the master keys corresponds to one of a plurality of service set identifiers for accessing the wireless wide area network.

22. The method of claim 15, further comprising utilizing a user interface on the access point to enable control of access privileges to each of the access terminals.

23. The method of claim 15, further comprising authenticating at least one of the plurality of master keys.

24. The method of claim 15, further comprising partitioning the wireless local area network into a plurality of subnets, such that each of the subnets is firewalled from each other one of the subnets.

25. The method of claim 24, wherein each of the master keys corresponds to one of the subnets.

26. The method of claim 15, wherein the access point is a cellular telephone.

27. An apparatus for wireless communication, comprising:
means for establishing a backhaul connection from an access point to a wireless wide area network;
means for establishing a wireless local area network from the access point utilizing a wireless local area network transceiver;
means for generating a plurality of master keys in the access point to provide a gateway to the wireless wide area network for a plurality of access terminals each utilizing a respective one of the master keys to access the wireless local area network, at least two of the plurality of master keys being associated with different network groups from each other, wherein each of the different network groups includes a different set of one or more of the access terminals; and
means for controlling an allocation of resources to at least one of the access terminals.

28. The apparatus of claim 27, wherein the means for controlling the allocation of resources comprises means for increasing or decreasing a priority of a flow corresponding to the at least one of the access terminals in accordance with one or more factors.

29. The apparatus of claim 28, wherein the factors comprise a quality of service or bandwidth demand for a particular access terminal.

30. The apparatus of claim 28, wherein the factors comprise a processing headroom available in the access point, and a demand or request for processing power from a particular access terminal.

31. The apparatus of claim 28, wherein the factors comprise revenue generated by granting access to the wireless wide area network to a particular access terminal.

32. The apparatus of claim 27, wherein each of the master keys corresponds to a single service set identifier for accessing the wireless wide area network.

33. The apparatus of claim 27, wherein each of the master keys corresponds to one of a plurality of service set identifiers for accessing the wireless wide area network.

34. The apparatus of claim 27, further comprising means for enabling a user to interface with the access point to enable control of access privileges to each of the access terminals.

35. The apparatus of claim 27, further comprising means for authenticating at least one of the plurality of master keys.

36. The apparatus of claim 27, further comprising means for partitioning the wireless local area network into a plurality of subnets, such that each of the subnets is firewalled from each other one of the subnets.

37. The apparatus of claim 36, wherein each of the master keys corresponds to one of the subnets.

38. The apparatus of claim 27, wherein the access point is a cellular telephone.

39. A computer program product, comprising:
a non-transitory computer-readable medium comprising code for:
establishing a backhaul connection from an access point to a wireless wide area network;
establishing a wireless local area network from the access point utilizing a wireless local area network transceiver;
generating a plurality of master keys in the access point to provide a gateway to the wireless wide area network for a plurality of access terminals each utilizing a respective one of the master keys to access the wireless local area network, at least two of the plurality of master keys being associated with different network groups from each other, wherein each of the different network groups includes a different set of one or more of the access terminals; and
controlling an allocation of resources to at least one of the access terminals.

40. The computer program product of claim 39, wherein the code for controlling the allocation of resources comprises code for increasing or decreasing a priority of a flow corresponding to the at least one of the access terminals in accordance with one or more factors.

41. The computer program product of claim 40, wherein the factors comprise a quality of service or bandwidth demand for a particular access terminal.

42. The computer program product of claim 40, wherein the factors comprise a processing headroom available in the access point, and a demand or request for processing power from a particular access terminal.

43. The computer program product of claim 40, wherein the factors comprise revenue generated by granting access to the wireless wide area network to a particular access terminal.

44. The computer program product of claim 39, wherein each of the master keys corresponds to a single service set identifier for accessing the wireless wide area network.

45. The computer program product of claim 39, wherein each of the master keys corresponds to one of a plurality of service set identifiers for accessing the wireless wide area network.

46. The computer program product of claim 39, further comprising code for enabling a user to interface with the access point to enable control of access privileges to each of the access terminals.

47. The computer program product of claim 39, further comprising code for authenticating at least one of the plurality of master keys.

48. The computer program product of claim 39, further comprising code for partitioning the wireless local area network into a plurality of subnets, such that each of the subnets is firewalled from each other one of the subnets.

49. The computer program product of claim 48, wherein each of the master keys corresponds to one of the subnets.

50. The computer program product of claim 39, wherein the access point is a cellular telephone.

\* \* \* \* \*